(12) United States Patent
Utsumi

(10) Patent No.: US 9,130,245 B2
(45) Date of Patent: Sep. 8, 2015

(54) NONAQUEOUS SECONDARY BATTERY AND FLAME RETARDANT FOR USE IN THE SAME

(75) Inventor: Hisayuki Utsumi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 634 days.

(21) Appl. No.: 13/534,790

(22) Filed: Jun. 27, 2012

(65) Prior Publication Data

US 2013/0004839 A1    Jan. 3, 2013

(30) Foreign Application Priority Data

Jun. 28, 2011   (JP) ................................. 2011-143326

(51) Int. Cl.
  *H01M 10/0567* (2010.01)
  *H01M 6/16* (2006.01)
  *H01M 10/052* (2010.01)

(52) U.S. Cl.
  CPC .......... *H01M 10/0567* (2013.01); *H01M 6/168* (2013.01); *H01M 10/052* (2013.01); *H01M 2300/0025* (2013.01); *Y02E 60/122* (2013.01)

(58) Field of Classification Search
  CPC .......... H01M 10/0567; H01M 10/052; H01M 6/168; H01M 2300/0025; Y02E 60/122
  See application file for complete search history.

(56) References Cited

U.S. PATENT DOCUMENTS

| 8,273,827 | B2 | 9/2012 | Hisha et al. |
| 2011/0104565 | A1 | 5/2011 | Utsumi |

FOREIGN PATENT DOCUMENTS

| CN | 102077403 A | 5/2011 |
| JP | 6-131308 | 5/1994 |
| JP | 11-329495 | 11/1999 |
| JP | 2001-525597 | 12/2001 |
| JP | 2002-25615 | 1/2002 |
| JP | 2007-200605 A | 8/2007 |
| WO | WO 2009/157261 | 12/2009 |
| WO | 2010/041710 A1 | 4/2010 |

*Primary Examiner* — Laura Weiner
(74) *Attorney, Agent, or Firm* — Nixon & Vanderhye P.C.

(57) ABSTRACT

A nonaqueous secondary battery comprising: a positive electrode; a negative electrode; and a nonaqueous electrolyte solution, wherein the nonaqueous electrolyte solution contains: a cyclic nitrogen-containing compound represented by the general formula (1):

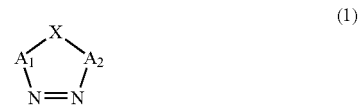

(1)

wherein X represents an optionally branched divalent group derived from a chain saturated hydrocarbon and having 1 to 5 carbon atoms, $=C=CH_2$, $=C=O$, $=C=S=O$, $=O$ or $=S$, and $A_1$ and $A_2$ may be the same or different and each represent an optionally substituted methylene group, $=C=O$ or $=SO_2$; and an amine derivative represented by the general formula (2):

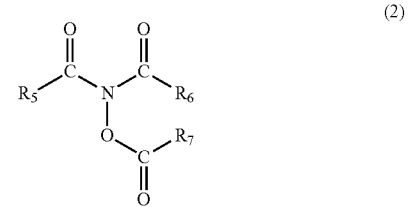

(2)

wherein $R_5$ to $R_7$ may be the same or different and each represent a hydrogen atom, or an optionally substituted lower alkyl group, lower alkenyl group, lower alkoxy group, lower alkylcarbonyloxy group, lower alkylcarbonyl group, lower cycloalkyl group or aryl group.

10 Claims, No Drawings

NONAQUEOUS SECONDARY BATTERY AND FLAME RETARDANT FOR USE IN THE SAME

CROSS-REFERENCE TO RELATED APPLICATION

This application is related to Japanese application No. 2011-143326 filed on Jun. 28, 2011, whose priority is claimed under 35 USC §119, the disclosure of which is incorporated by reference in its entirety.

BACKGROUND OF THE INVENTION

1. Field of the Invention

The present invention relates to a nonaqueous secondary battery and a flame retardant for use in the battery. More particularly, the present invention relates to a highly safe nonaqueous secondary battery having excellent battery performance and to a flame retardant for use in the battery.

2. Description of the Related Art

In recent years, reduction in size and weight of electronic devices has been remarkably progressed, and with the progress, it has been demanded that secondary batteries that are used for such electronic devices should have higher energy density. An example of secondary batteries that can meet the demand is a secondary battery using a nonaqueous electrolyte solution (hereinafter, referred to as nonaqueous secondary battery) such as a lithium-ion secondary battery.

The nonaqueous electrolyte solution contains an electrolyte salt such as a lithium salt and a nonaqueous solvent. The nonaqueous solvent is desired to have high dielectric constant and high oxidation potential, and to be stable in batteries regardless of operation environment.

As such a nonaqueous solvent, aprotic solvents are used, and known examples thereof include high-permittivity solvents such as cyclic carbonates including ethylene carbonate and propylene carbonate, and cyclic carboxylate esters including γ-butyrolactone; and low-viscosity solvents such as chain carbonates including diethyl carbonate and dimethyl carbonate, and ethers including dimethoxyethane. Usually, a high-permittivity solvent and a low-viscosity solvent are used in combination.

However, the nonaqueous secondary battery may suffer from leakage of the nonaqueous electrolyte solution due to a defect involving increased internal pressure caused by breakage of the battery or any other reason. The leakage of the nonaqueous electrolyte solution may lead to short-circuit between a positive electrode and a negative electrode to cause generation of fire or burning. It may also lead to generation of heat in the nonaqueous secondary battery to cause vaporization and/or decomposition of the organic solvent-based nonaqueous solvent to produce gas. In some cases, the produced gas caught fire or caused rupture of the nonaqueous secondary battery. In order to solve the above-described problems, studies have been carried out to give flame retardancy by adding a flame retardant to the nonaqueous electrolyte solution.

As the flame retardant, phosphazene derivatives, azobis (isobutyronitrile) (AIBN), imidazole compounds have been proposed. However, these flame retardants degrade the battery performance when the amount thereof is increased for improvement of the flame retardancy. The present inventor has therefore proposed use of a cyclic nitrogen-containing compound as a flame retardant (WO 2009/157261).

SUMMARY OF THE INVENTION

According to an aspect of the present invention, therefore, there is provided a nonaqueous secondary battery comprising: a positive electrode; a negative electrode; and a nonaqueous electrolyte solution, wherein the nonaqueous electrolyte solution contains: a cyclic nitrogen-containing compound represented by the general formula (1):

(1)

wherein X represents an optionally branched divalent group derived from a chain saturated hydrocarbon and having 1 to 5 carbon atoms, $=C=CH_2$, $=C=O$, $=C=S=O$, $=O$ or $=S$, and $A_1$ and $A_2$ may be the same or different and each represent an optionally substituted methylene group, $=C=O$ or $=SO_2$; and an amine derivative represented by the general formula (2):

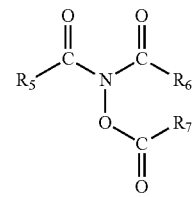

(2)

wherein $R_5$ to $R_7$ may be the same or different and each represent a hydrogen atom, or an optionally substituted lower alkyl group, lower alkenyl group, lower alkoxy group, lower alkylcarbonyloxy group, lower alkylcarbonyl group, lower cycloalkyl group or aryl group.

According to another aspect of the present invention, there is provided a flame retardant for a nonaqueous secondary battery, comprising: a cyclic nitrogen-containing compound represented by the general formula (1):

(1)

wherein X represents an optionally branched divalent group derived from a chain saturated hydrocarbon and having 1 to 5 carbon atoms, $=C=CH_2$, $=C=O$, $=C=S=O$, $=O$ or $=S$, and $A_1$ and $A_2$ may be the same or different and each represent an optionally substituted methylene group, $=C=O$ or $=SO_2$; and an amine derivative represented by the general formula (2):

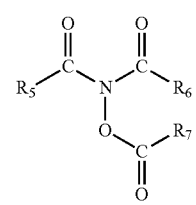

(2)

wherein $R_5$ to $R_7$ may be the same or different and each represent a hydrogen atom, or an optionally substituted lower alkyl group, lower alkenyl group, lower alkoxy group, lower alkylcarbonyloxy group, lower alkylcarbonyl group, lower cycloalkyl group or aryl group.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

The flame retardant for the nonaqueous secondary battery, which contains a cyclic nitrogen-containing compound, disclosed in WO 2009/157261 develops sufficient flame retardancy by the action of nitrogen gas generated through thermal decomposition in abnormal temperature rise. Even the technique disclosed in WO 2009/157261 can therefore provide sufficient flame retardancy without degrading the battery performance. In recent years, however, the demand for the safety of nonaqueous secondary batteries has been increased, and therefore further reduction of the battery performance degradation and further improvement of the flame retardancy has been desired.

The present inventor has made intensive studies about flame retardant for nonaqueous secondary batteries and, as a result, unexpectedly found that a nonaqueous secondary battery is enabled to produce sufficient flame retardancy when a nonaqueous electrolyte solution therein contains a cyclic compound having a nitrogen-nitrogen unsaturated bond in its molecule, and therefore the safety and the reliability of the nonaqueous secondary battery in abnormal temperature rise can be secured. The finding is disclosed in WO 2009/157261. Further, the present inventor has made intensive studies and, as a result, found that combination use of the cyclic nitrogen-containing compound with an amine derivative having a specific structure achieves effective inhibition of reductive decomposition of the nonaqueous electrolyte solution even at high temperature, and therefore sufficient flame retardancy can be ensured without degrading the battery performance in a wider temperature range. Thus, the present inventor has reached the present invention. Since the amine derivative having the specific structure does not affect electric characteristics of a nonaqueous secondary battery over a wide temperature range, it is possible to provide a nonaqueous secondary battery showing stable cycle characteristics.

The nonaqueous secondary battery of the present invention includes a positive electrode, a negative electrode and a nonaqueous electrolyte solution. In particular, in the nonaqueous electrolyte solution, the present invention characteristically has an amine derivative having a structure of the general formula (2) in addition to a cyclic nitrogen-containing compound of the general formula (1). The nonaqueous electrolyte solution contains the cyclic nitrogen-containing compound, the amine derivative and an electrolyte salt.

(a) Nonaqueous Electrolyte Solution
(Amine Derivative)

The inventor considers that an amine derivative having the structure of the general formula (2) mainly has a role in improvement of the battery performance. The present inventor has found that a nonaqueous secondary battery containing the amine derivative is durable against temperature change (for example, the capacity retention is high in a wide temperature range). The inventor considers this is because the amine derivative forms coating on surfaces of a positive-electrode active material and a negative-electrode active material. In particular, it is possible to improve the capacity retention in a high temperature range of 45 to 60° C. For example, unlike a nonaqueous secondary battery not containing the amine derivative, the nonaqueous secondary battery containing the amine derivative has a capacity retention of 90% or more in the high temperature range.

Hereinafter, the amine derivative usable in the present invention will be described.

The amine derivative usable in the present invention is represented by the general formula (2):

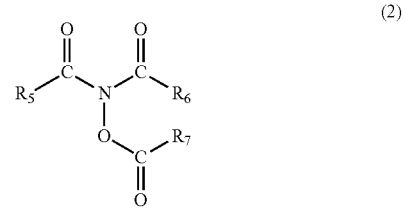

(2)

In the general formula (2), $R_5$, $R_6$ and $R_7$ may be the same or different and each represent a hydrogen atom, or an optionally substituted lower alkyl group, lower alkenyl group, lower alkoxy group, lower alkylcarbonyloxy group, lower alkylcarbonyl group, lower cycloalkyl group or aryl group.

Here, the term "lower" means 1 to 6 carbon atoms, for example. In the case of the cycloalkyl group, however, the term "lower" means 3 to 6 carbon atoms, for example.

As the lower alkyl group, may be mentioned linear or branched alkyl group having 1 to 6 carbon atoms. Specific examples thereof include methyl group, ethyl group, n-propyl group, isopropyl group, n-butyl group, isobutyl group, sec-butyl group, tert-butyl group, n-pentyl group, isopentyl group, neopentyl group, tert-pentyl group, n-hexyl group and isohexyl group. Out of them, alkyl group having 1 to 4 carbon atoms is preferable, and methyl group and tert-butyl group are particularly preferable.

As the lower alkenyl group, may be mentioned linear or branched alkenyl group having 2 to 6 carbon atoms, and linear alkenyl group having 2 to 4 carbon atoms is preferable. Specific examples thereof include vinyl group, 1-propenyl group, allyl group (2-propenyl group), 1-butenyl group, 2-butenyl group and 3-butenyl group. Out of them, vinyl group is particularly desirable.

As the lower alkoxy group, may be mentioned linear or branched alkoxy group having 1 to 6 carbon atoms. Specific examples thereof include methoxy group, ethoxy group, n-propoxy group, isopropoxy group, n-butoxy group, isobutoxy group, sec-butoxy group, tert-butoxy group, n-pentyloxy group, isopentyloxy group, neopentyloxy group, tert-pentyloxy group, n-hexyloxy group and isohexyloxy group. Out of them, alkoxy group having 1 to 4 carbon atoms is preferable, and methoxy group is particularly preferable.

As the lower alkylcarbonyloxy group, may be mentioned group which is derived from a lower fatty acid and in which hydrogen atom is removed from the lower fatty acid. Specific examples thereof include formyloxy group, acetoxy group, propionyloxy group, butyryloxy group, isobutyryloxy group, valeryloxy group, isovaleryloxy group and pivaloyloxy group. Out of them, alkylcarbonyloxy group having 1 to 4 carbon atoms is preferable, and acetoxy group is particularly preferable.

The lower alkylcarbonyl group is acyl group derived from a lower fatty acid, that is, lower fatty acyl group. Specific examples thereof include formyl group, acetyl group, propionyl group, butyryl group, isobutyryl group, valeryl group, isovaleryl group and pivaloyl group. Out of them, alkylcarbonyl group having 1 to 4 carbon atoms is preferable, and acetyl group is particularly preferable.

As the lower cycloalkyl group, may be mentioned cycloalkyl group having 3 to 6 carbon atoms. Specific examples thereof include cyclopropyl group, cyclobutyl group, cyclopentyl group and cyclohexyl group. Out of them, cycloalkyl group having 3 or 4 carbon atoms is preferable, and cyclopropyl group and cyclobutyl group are particularly preferable.

As the aryl group, may be mentioned aryl group having 6 to 10 carbon atoms. Specific examples thereof include phenyl group, 1-naphthyl group and 2-naphthyl group. Out of them, phenyl group and 2-naphthyl group are particularly preferable.

As substituents for $R_5$ to $R_7$, may be mentioned halogen atoms such as fluorine atom, chlorine atom and bromine atom; alkyl group such as methyl group and ethyl group; alkoxy group such as methoxy group and ethoxy group; and aryl group such as phenyl group.

Specific examples of the amine derivative include N,N,O-triacetylhydroxylamine, N,N-diacetyl-O-butyrylhydroxylamine, N,N-diacetyl-O-benzoylhydroxylamine, N,N-diacetyl-O-(p-methylbenzoyl)hydroxylamine and N,N-diacetyl-O-cyclohexylcarbonylhydroxylamine.

Any commonly known amine derivatives may be used.

(Cyclic Nitrogen-Containing Compound)

The inventor considers that the mechanism for the cyclic nitrogen-containing compound having a structure of the general formula (1) to exert flame retardancy is as follows: in the case of thermal runaway, which starts fire, of the nonaqueous secondary battery, thermal decomposition is caused to generate nitrogen ($N_2$) gas and, as a result, reduce the ambient oxygen concentration thereby to extinguish the fire (anoxic extinction). In order to achieve such a mechanism, the cyclic nitrogen-containing compound is required to have a double bond between nitrogen atoms (azo bond).

The cyclic nitrogen-containing compound usable in the present invention is represented by the general formula (1):

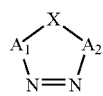

(1)

In the formula (1), X represents an optionally branched divalent group derived from a chain saturated hydrocarbon and having 1 to 5 carbon atoms, =C=$CH_2$, =C=O, =C=S=O, =O or =S. By selecting one out of the above-mentioned substituents as X, both the flame retardancy and the battery performance can be highly achieved.

Examples of the divalent group derived from a chain saturated hydrocarbon include linear and branched groups. Examples of the linear divalent group include methylene group, ethylene group, trimethylene group, tetramethylene group, pentamethylene group, tetraethylene group and pentaethylene group. Examples of the branched divalent group include methyl methylene group, ethyl methylene group, methyl ethylene group, ethyl ethylene group, methyl trimethylene group, ethyl trimethylene group and methyl tetramethylene group. Preferably, these divalent groups are linear. The linear divalent groups are advantageous in that they can give better flame retardancy and they can be readily synthesized.

$A_1$ and $A_2$ may be the same or different and each represent an optionally substituted methylene group, =C=O or =$SO_2$.

Examples of the substituent for the methylene group include halogen atom, lower alkyl group, lower alkoxy group, ester group, optionally substituted cycloalkyl group and optionally substituted aryl group. When $A_2$ is a methylene group, specifically, the cyclic nitrogen-containing compound is represented by the general formula (1a):

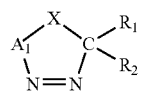

In the formula (1a), X and $A_1$ are as defined in the general formula (1).

$R_1$ and $R_2$ may be the same or different and each represent hydrogen atom, halogen atom, lower alkyl group, lower alkoxy group, ester group, optionally substituted cycloalkyl group or optionally substituted aryl group.

When $A_2$ in the general formula (1a) is also a methylene group, the cyclic nitrogen-containing compound is represented by the general formula (1b):

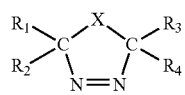

In the formula (1b), X, $R_1$ and $R_2$ are as defined in the general formula (1a).

$R_3$ and $R_4$ may be the same or different and each represent hydrogen atom, halogen atom, lower alkyl group, lower alkoxy group, ester group, optionally substituted cycloalkyl group or optionally substituted aryl group.

Examples of the halogen atom include fluorine atom, chlorine atom and bromine atom. Out of these, chlorine atom or fluorine atom is preferable, and chlorine atom is particularly preferable.

Examples of the lower alkyl group include an alkyl group having 1 to 4 carbon atoms such as, in particular, methyl group, ethyl group, n-propyl group, isopropyl group, n-butyl group, isobutyl group, sec-butyl group and tert-butyl group.

Examples of the lower alkoxy group include an alkyl group having 1 to 4 carbon atoms that is attached via a single end ether bond such as, in particular, methoxy group, ethoxy group, n-propoxy group, isopropoxy group, n-butoxy group, isobutoxy group, sec-butoxy group and tert-butoxy group.

Examples of the ester group include an alkyl group having 1 to 4 carbon atoms that is attached via a single end ester bond.

Examples of the cycloalkyl group include a cycloalkyl group having 3 to 6 carbon atoms such as, in particular, cyclopropyl group, cyclobutyl group, cyclopentyl group and cyclohexyl group. Examples of the substituent for the cycloalkyl group include halogen atoms such as chlorine atom and fluorine atom, and a lower alkyl group having 1 to 4 carbon atoms.

Examples of the aryl group include phenyl group and naphthyl group. Examples of the substituent for the aryl group include halogen atoms such as chlorine atom and fluorine atom, and a lower alkyl group having 1 to 4 carbon atoms.

For the purpose of highly achieving both the flame retardancy and the battery performance, $R_1$ to $R_4$ are each preferably selected from hydrogen atom, chlorine atom, an alkyl group having 1 to 4 carbon atoms, an alkoxy group having 1 to 4 carbon atoms and a cycloalkyl group. Further, for the purpose of more highly achieving both the flame retardancy and battery performance, $R_1$ to $R_4$ are each preferably selected from hydrogen atom, chlorine atom, methyl group, ethyl group, methoxy group, ethoxy group, methyl ester group, ethyl ester group, cyclopropyl group, cyclobutyl group, cyclopentyl group and cyclohexyl group.

In addition, when $R_1$ to $R_4$ are substituents of different kinds, the positions of the substituents are not particularly limited. For example, when two substituents of one kind and two substituents of another kind are included, $R_1$ and $R_2$ may be the same substituent, and $R_3$ and $R_4$ may be the same substituent, or $R_1$ and $R_2$ may be different substituents, and $R_3$ and $R_4$ may be different substituents. Furthermore, a mixture of constitutional isomers may be used.

When X is a divalent group derived from a chain saturated hydrocarbon, the cyclic nitrogen-containing compound is represented by the general formula (1c):

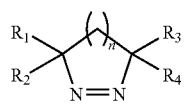

In the formula (1c), "n" represents an integer from 1 to 5, and $R_1$ to $R_4$ are as defined in the general formula (1b).

Solubility of the cyclic nitrogen-containing compound in an aprotic solvent can be controlled by controlling, for example, the kinds of $R_1$ to $R_4$ and the ring size. Thus, the cyclic nitrogen-containing compound is enabled to have no effect on the electric characteristics of the nonaqueous secondary battery in a normal situation and to be decomposed to generate nitrogen gas thereby to control thermal runaway in an abnormal situation. The solubility can be increased by increasing the number of carbon atoms of $R_1$ to $R_4$, using an aromatic group or increasing the ring size, for example. Furthermore, the solubility in a nonaqueous solvent can be increased also by selecting $=C=CH_2$, $=C=O$, $=C=S=O$, $=O$ or $=S$ as X.

Moreover, the cyclic nitrogen-containing compound is enabled to have no effect on the electric characteristics of the nonaqueous secondary battery in a normal situation and to be decomposed to generate nitrogen gas thereby to control thermal runaway in an abnormal situation, when the groups as $A_1$ and $A_2$ are selected from the above-mentioned kinds.

The cyclic nitrogen-containing compound produces nitrogen gas when heated at a temperature higher than its decomposition temperature. The decomposition temperature is preferably 100° C. or more higher than normal ambient temperature where the nonaqueous secondary battery is used, in particular, 100° C. to 300° C., and more preferably 140° C. to 250° C. When the difference between the decomposition temperature and the normal ambient temperature is less than 100° C., the cyclic nitrogen-containing compound may be decomposed during normal use, and in this case, the electric characteristics of the nonaqueous secondary battery will be degraded. Here, the decomposition temperature can be controlled by controlling the ring size and substituent effects.

Specific examples of the cyclic nitrogen-containing compound include 3,3,6,6-tetramethyl-3,4,5,6-tetrahydropyridazine, dichloro-4,5-dihydro-3H-pyrazole, 4,5,6,7,8,9-hexahydro-3H-[1,2]diazonine, 2,2,5,5-tetramethyl-1,3,4-oxadiazoline, 3,3,5,5-tetramethyl-1-pyrazole-4-one, [1,4,2,3]dithiadiazole-1,1,4,4-tetroxide, 4,4-dimethyl-4,5-dihydro-[1,2,3]thiadiazole-1,1-dioxide, 3,3,5,5-tetramethyl-4-methylene-1-pyrazoline The cyclic nitrogen-containing compound can be obtained by, for example, cyclizing a dibromo derivative using hydrazine to obtain a diaziridine derivative and dehydrogenating the diaziridine derivative using a dehydrogenation catalyst (for example, tungstate, molybdate, nickelate) as shown in the following reaction schemes. Of these reaction schemes, the scheme (1), the scheme (2) and the scheme (3) are reaction schemes for the compounds of the general formula (1), the general formula (1a) and the general formula (1b), respectively.

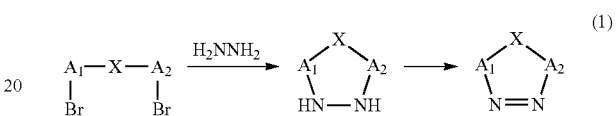

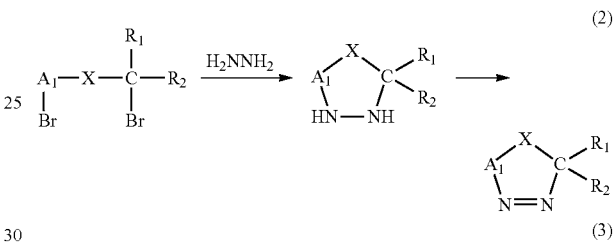

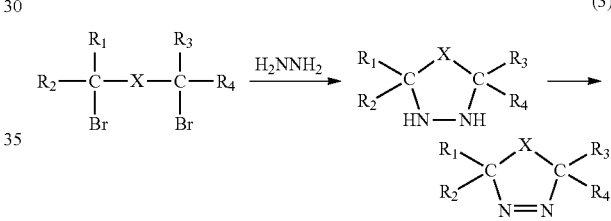

The dibromo derivative can be readily obtained by substituting hydrogen atoms with bromine atoms by a commonly known method.

In addition, the compound of the general formula (1c) can be obtained by, for example, cyclizing a diamine derivative in the presence of a dehydrogenation catalyst (for example, tungstate, molybdate, nickelate) as shown in the following scheme:

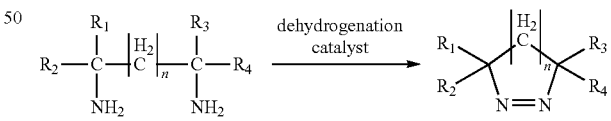

The diamine derivative can be readily obtained by substituting hydroxyl groups of a diol derivative with amino groups by a commonly known method.

(Content Percentage of Cyclic Nitrogen-Containing Compound and Amine Derivative)

The percentage of the cyclic nitrogen-containing compound to be blended in the nonaqueous electrolyte solution is preferably in a range of 1 to 70% (v/v) by volume fraction. When the percentage is less than 1%, rupture and generation of fire of the nonaqueous secondary battery may not be sufficiently inhibited. On the other hand, when the percentage is more than 70%, the performance of the nonaqueous secondary battery may be deteriorated in a low-temperature environment. The percentage can be 1%, 5%, 10%, 15%, 20%, 25%, 30%, 35%, 40%, 45%, 50%, 55%, 60%, 65% and 70%. The percentage is more preferably in a range of 5 to 40%, and still more preferably in a range of 10 to 30%.

The percentage of the amine derivative to be blended in the nonaqueous electrolyte solution is in a range of 0.09 to 80% (v/v) by volume fraction. When the percentage is less than 0.09%, the effect by the amine derivative contained may not be sufficiently produced. When the percentage is more than 80%, the performance of the nonaqueous secondary battery may be deteriorated in a low-temperature environment. The percentage can be 0.09%, 5%, 10%, 15%, 20%, 25%, 30%, 35%, 40%, 45%, 50%, 55%, 60%, 65%, 70%, 75% and 80%. The percentage is more preferably in a range of 0.47 to 40%, and still more preferably in a range of 0.95 to 20%.

(Electrolyte Salt)

As the electrolyte salt, a lithium salt is usually used. The lithium salt is not particularly limited, as long as it dissolves in the nonaqueous solvent contained in the nonaqueous electrolyte solution. Examples thereof include $LiClO_4$, $LiCl$, $LiBF_4$, $LiPF_6$, $LiAsF6$, $LiSbF6$, $LiN(SO_2CF_3)_2$, $LiC(SO_2CF_3)_2$, lower aliphatic carboxylate lithium, chloroborane lithium and 4-phenyllithium borate. The lithium salts can be used independently or in combination. The amount of the electrolyte salt to add is preferably 0.1 to 3 mol with respect to 1 kg of the nonaqueous solvent. The amount can be 0.1 mol, 0.5 mol, 1.0 mol, 1.5 mol, 2.0 mol, 2.5 mol and 3.0 mol. More preferably the amount is 0.5 to 2 mol.

(Other Additives)

The nonaqueous electrolyte solution may contain other additives such as a nonaqueous solvent, a dehydrator and a deoxidizer.

(i) Nonaqueous Solvent

Since the cyclic nitrogen-containing compound and/or the amine derivative can be used as nonaqueous solvents as long as the compound and/or the derivative are in a liquid state at an operating temperature of the nonaqueous secondary battery, and as long as it is possible to obtain a nonaqueous secondary battery having sufficient battery characteristics, addition of another nonaqueous solvent is optional. However, in terms of enhancement in charge/discharge characteristics and resistance to low temperature of the nonaqueous secondary battery, the cyclic nitrogen-containing compound and/or the amine derivative are preferably mixed with another nonaqueous solvent.

As the nonaqueous solvent, aprotic organic solvents can be usually used. Examples of the aprotic solvents include, but not particularly limited to, dimethyl carbonate, diethyl carbonate, ethyl methyl carbonate, dipropyl carbonate, propylene carbonate, ethylene carbonate, butylene carbonate, γ-butyrolactone, γ-valerolactone, tetrahydrofuran, 2-methyltetrahydrofuran, dimethyl sulfoxide, 1,3-dioxolane, formamide, dimethylformamide, acetonitrile, methyl formate, methyl acetate, diethyl ether, 1,2-dimethoxyethane, 1,2-diethoxyethane, ethoxymethoxyethane, dioxane, sulfolane and methylsulfolane. The organic solvents may be used independently or in combination.

(ii) Dehydrator and Deoxidizer

As the dehydrator and the deoxidizer, conventionally known agents can be used, for example. Specific examples thereof include vinylene carbonate, fluoroethylene carbonate, trifluoropropylene carbonate, phenyl ethylene carbonate, succinic anhydride, glutaric anhydride, maleic anhydride, ethylene sulfite, 1,3-propane sultone, 1,4-butane sultone, methyl methanesulphonate, dibutylsulphide, heptane, octane and cycloheptane. They are usually contained in the nonaqueous solvent at a concentration of 0.1% by weight or more to 5% by weight or less. Then, the capacity maintenance characteristics and the cycle characteristics after storage in a high-temperature environment can be improved.

(b) Positive Electrode

The positive electrode can be produced by applying, drying and pressurizing a paste containing, for example, a positive-electrode active material, a conductive material, a binder and an organic solvent on a positive-electrode current collector. The conductive material in an amount of 1 part by weight to 20 parts by weight, the binder in an amount of 1 part by weight to 15 parts by weight and the organic solvent in an amount of 30 parts by weight to 60 parts by weight can be blended with respect to 100 parts by weight of the positive-electrode active material. The amount of the conductive material can be 1 part by weight, 3 parts by weight, 6 parts by weight, 9 parts by weight, 12 parts by weight, 15 parts by weight, 18 parts by weight and 20 parts by weight. The amount of the binder can be 1 part by weight, 3 parts by weight, 6 parts by weight, 9 parts by weight, 12 parts by weight and 15 parts by weight. The amount of the organic solvent can be 30 parts by weight, 35 parts by weight, 40 parts by weight, 45 parts by weight, 50 parts by weight, 55 parts by weight and 60 parts by weight.

Examples of the positive-electrode active material usable here include lithium complex oxides such as $LiNiO_2$, $LiCoO_2$, $LiMn_2O_4$ and $LiFePO_4$; and compounds obtained by substituting one or more elements in these oxides with other elements (for example, Fe, Si, Mo, Cu and Zn).

Examples of the conductive material include carbonaceous materials such as acetylene black and ketjen black.

Examples of the binder include polyvinylidene fluoride (PVdF), polyvinyl pyridine and polytetrafluoroethylene.

Examples of the organic solvent include N-methyl-2-pyrrolidone (NMP) and N,N-dimethylformamide (DMF).

Examples of the positive-electrode current collector include a foil or a thin sheet of a conductive metal such as SUS and aluminum.

(c) Negative Electrode

The negative electrode can be produced by applying, drying and pressurizing a paste containing, for example, a negative-electrode active material, a conductive material, a binder and an organic solvent on a negative-electrode current collector. The conductive material in an amount of 1 part by weight to 15 parts by weight, the binder in an amount of 1 part by weight to 10 parts by weight and the organic solvent in an amount of 40 parts by weight to 70 parts by weight can be blended with respect to 100 parts by weight of the negative-electrode active material. The amount of the conductive material can be 1 part by weight, 3 parts by weight, 6 parts by weight, 9 parts by weight, 12 parts by weight and 15 parts by weight. The amount of the binder can be 1 part by weight, 3 parts by weight, 6 parts by weight, 9 parts by weight and 10 parts by weight. The amount of the organic solvent can be 40 parts by weight, 45 parts by weight, 50 parts by weight, 55 parts by weight, 60 parts by weight, 65 parts by weight and 70 parts by weight.

Examples of the negative-electrode active material include pyrolyzed carbons, cokes, graphites, glassy carbons, sintered organic polymer compounds, carbon fibers and activated carbons.

Examples of the conductive material include carbonaceous materials such as acetylene black and ketjen black.

Examples of the binder include polyvinylidene fluoride, polyvinyl pyridine and polytetrafluoroethylene.

Examples of the organic solvent include N-methyl-2-pyrrolidone (NMP) and N,N-dimethylformamide (DMF).

Examples of the negative-electrode current collector include a foil of a metal such as copper.

(d) Separator

A separator may be interposed between the negative electrode and the positive electrode.

The material of the separator is usually a porous film, selected in view of solvent resistance and reducibility resistance. Suitable examples thereof include a porous film and a nonwoven fabric of a polyolefin resin such as polyethylene and polypropylene. The film and the nonwoven fabric of such materials may be used as a single layer or multiple layers. In the case of multiple layers, it is preferable that at least one sheet of a nonwoven fabric is used in view of the cycle characteristics, performance at low temperature and load characteristics.

(e) Structure of Nonaqueous Secondary Battery

A nonaqueous secondary battery can be obtained by injecting a nonaqueous electrolyte solution between the negative electrode and the positive electrode optionally having a separator therebetween. Further, a plurality of units (cells) each including a pair of a negative electrode and a positive electrode may be stacked.

Other than those mentioned, generally used and commonly known members can be used to constitute the nonaqueous secondary battery.

The form of the nonaqueous secondary battery is not particularly limited, and examples thereof include various forms such as a button type, a coin type, a rectangular type, a cylinder type having a spiral structure and a laminate type, which can be varied in size such as a thin type and a large size according to use.

Hereinafter, the present invention will be described in detail with reference to examples and comparative examples; however, the present invention is not limited to the following examples and comparative examples at all.

EXAMPLE 1

To 79.5 g of a mixed solvent of ethylene carbonate and diethyl carbonate (mixing ratio (volume ratio): ethylene carbonate/diethyl carbonate=1/2) (aprotic organic solvent), 20.0 g of a cyclic nitrogen-containing compound represented by the following formula (1-1) (a six-membered ring compound represented by the general formula (1b), wherein $R_1$ to $R_4$ represent methyl groups, X represents a hydrocarbon group having 2 carbon atoms (ethylene group), (a flame retardant for nonaqueous secondary batteries, 3,3,6,6-tetramethyl-3,4,5,6-tetrahydropyridazine, decomposition temperature: 146° C.)

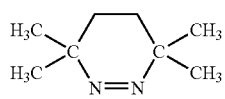

(1-1)

and 0.5 g of an amine derivative represented by the following formula (2-1) (N,N,O-triacetylhydroxylamine represented by the general formula (2), wherein $R_5$ to $R_7$ are methyl groups (product by Tokyo Chemical Industry Co., Ltd.) (amine derivative A) were added.

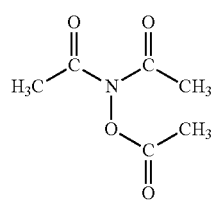

(2-1)

In the mixed solvent obtained, $LiPF_6$ as a lithium salt was dissolved at a concentration of 1.0 mol/kg to prepare a nonaqueous electrolyte solution.

$LiFePO_4$ as a positive-electrode active material in an amount of 100 parts by weight, acetylene black as a conductive material in an amount of 5 parts by weight, PVdF as a binder in an amount of 7 parts by weight and NMP as a solvent in an amount of 40 parts by weight were kneaded for dispersion with a planetary mixer to prepare a paste for positive electrode formation. The paste prepared was applied with a coater uniformly onto both sides of a band-like aluminum foil having a thickness of 20 μm constituting a positive-electrode current collector. Here, an end portion of the aluminum foil was left uncoated for connection of a terminal. The coat was dried under vacuum at 130° C. for 8 hours to remove the solvent, and then pressed by using a hydraulic press machine to form a positive electrode. The positive electrode obtained was cut into a predetermined size for use.

A natural powdered graphite manufactured in China as a negative-electrode active material (average particle diameter: 15 μm) in an amount of 100 parts by weight, vapor grown carbon fiber (VGCF) powder (VGCF, high-bulk-density product by Showa Denko K.K. Corporation) as a conductive material in an amount of 2 parts by weight, PVdF as a binder in an amount of 2 parts by weight and NMP as a solvent in an amount of 50 parts by weight were kneaded for dispersion with a planetary mixer to prepare a paste for negative electrode formation. The paste prepared was applied with a coater uniformly onto both sides of a copper foil having a thickness of 10 μm constituting a negative-electrode current collector. Here, an end portion of the copper foil was left uncoated for connection of a terminal. Further, the coat was dried under vacuum at 100° C. for 8 hours to remove the solvent, and then pressed by using a hydraulic press machine to form a negative electrode. The negative electrode obtained was cut into a predetermined size for use.

The positive and negative electrodes obtained were stacked to form a laminate with a polypropylene porous film as a separator interposed therebetween, and then the nonaqueous electrolyte solution was injected into the laminate to produce a nonaqueous secondary battery.

EXAMPLE 2

A nonaqueous secondary battery was produced in the same manner as in Example 1 except that the amount of the mixed solvent of ethylene carbonate and diethyl carbonate was changed to 98.5 g, the amount of the cyclic nitrogen-containing compound was changed to 1 g, and the amount of the amine derivative A was changed to 0.5 g.

EXAMPLE 3

A nonaqueous secondary battery was produced in the same manner as in Example 1 except that the amount of the mixed solvent of ethylene carbonate and diethyl carbonate was changed to 39.5 g, the amount of the cyclic nitrogen-containing compound was changed to 60 g, and the amount of the amine derivative A was changed to 0.5 g.

EXAMPLE 4

A nonaqueous secondary battery was produced in the same manner as in Example 1 except that the amount of the mixed solvent of ethylene carbonate and diethyl carbonate was changed to 77 g, the amount of the cyclic nitrogen-containing compound was changed to 20 g, and the amount of the amine derivative A was changed to 3 g.

EXAMPLE 5

A nonaqueous secondary battery was produced in the same manner as in Example 1 except that the amount of the mixed solvent of ethylene carbonate and diethyl carbonate was changed to 79.5 g, the amount of the cyclic nitrogen-containing compound was changed to 20 g, and the amine derivative was changed to 0.5 g of N,N-diacetyl-O-benzoylhydroxylamine represented by the following formula (2-2), which is an amine derivative represented by the general formula (2), wherein $R_5$ and $R_6$ are methyl groups, and $R_7$ is a phenyl group (amine derivative B).

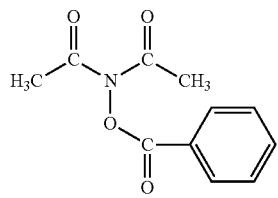

(2-2)

EXAMPLE 6

A nonaqueous secondary battery was produced in the same manner as in Example 1 except that the amount of the mixed solvent of ethylene carbonate and diethyl carbonate was changed to 79.5 g, the amount of the cyclic nitrogen-containing compound was changed to 20 g, and the amine derivative was changed to 0.5 g of N,N-diacetyl-β-cyclohexylcarbonylhydroxylamine represented by the following formula (2-3), which is an amine derivative represented by the general formula (2), wherein $R_5$ and $R_6$ are methyl groups, and $R_7$ is a cyclohexyl group (amine derivative C).

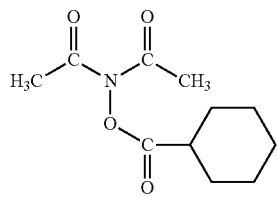

(2-3)

EXAMPLE 7

A nonaqueous secondary battery was produced in the same manner as in Example 1 except that 80 g of a mixed solvent prepared by mixing ethylene carbonate and the amine derivative A (volume ratio: ethylene carbonate/amine derivative A=1/2) was used, and the amount of the cyclic nitrogen-containing compound was changed to 20 g.

EXAMPLE 8

A nonaqueous secondary battery was produced in the same manner as in Example 1 except that the six-membered ring compound was changed to a five-membered ring compound represented by the following formula (1-2), that is, a cyclic nitrogen-containing compound represented by the general formula (1b), wherein X represents a hydrocarbon group having 1 carbon atom (methylene group), and two of $R_1$ to $R_4$ represent hydrogen atoms, and the others represent chlorine atoms (dichloro-4,5-dihydro-3H-pyrazole, decomposition temperature: 179° C.). Here, used as the five-membered ring compound was a mixture of a compound in which $R_1$ and $R_3$ are hydrogen atoms, and $R_2$ and $R_4$ are chlorine atoms; and a compound in which $R_1$ and $R_4$ are hydrogen atoms, and $R_2$ and $R_3$ are chlorine atoms.

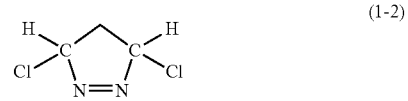

(1-2)

EXAMPLE 9

A nonaqueous secondary battery was produced in the same manner as in Example 1 except that the six-membered ring compound was changed to a nine-membered ring compound represented by the following formula (1-3), that is, a cyclic nitrogen-containing compound represented by the general formula (1b), wherein X represents a hydrocarbon group having 5 carbon atoms (pentamethylene group), and $R_1$ to $R_4$ represent hydrogen atoms (4,5,6,7,8,9-hexahydro-3H-[1,2] diazonine, decomposition temperature: 192° C.).

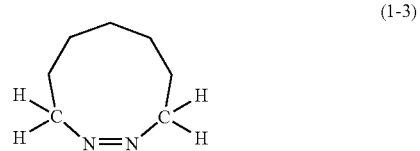

(1-3)

EXAMPLE 10

A nonaqueous secondary battery was produced in the same manner as in Example 1 except that the cyclic nitrogen-containing compound was changed to a cyclic nitrogen-containing compound represented by the following formula (1-4), (a five-membered ring compound represented by the general formula (1), wherein X represents an oxygen atom, $A_1$ and $A_2$ represent carbon atoms, and $R_1$ to $R_4$ represent methyl groups (2,2,5,5-tetramethyl-1,3,4-oxadiazoline, decomposition temperature: 127° C.)).

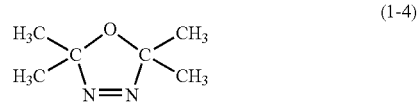

(1-4)

EXAMPLE 11

A nonaqueous secondary battery was produced in the same manner as in Example 1 except that the cyclic nitrogen-containing compound was changed to a cyclic nitrogen-containing compound represented by the following formula (1-5) (a five-membered ring compound represented by the general formula (1b), wherein X represents =C=O, and $R_1$ to $R_4$ represent methyl groups (3,3,5,5-tetramethyl-1-pyrazole-4-one, decomposition temperature: 141° C.)).

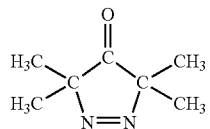
(1-5)

EXAMPLE 12

A nonaqueous secondary battery was produced in the same manner as in Example 1 except that the cyclic nitrogen-containing compound was changed to a cyclic nitrogen-containing compound represented by the following formula (1-6), (a five-membered ring compound represented by the general formula (1), wherein X represents a methylene group, and $A_1$ and $A_2$ represent =$SO_2$ ([1,4,2,3]dithiadiazole-1,1,4,4-tetroxide, decomposition temperature: 187° C.)).

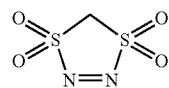
(1-6)

EXAMPLE 13

A nonaqueous secondary battery was produced in the same manner as in Example 1 except that the cyclic nitrogen-containing compound was changed to a cyclic nitrogen-containing compound represented by the following formula (1-7), (a five-membered ring compound represented by the general formula (1a), wherein X represents a methylene group, $A_1$ represents =$SO_2$, and $R_1$ and $R_2$ represent methyl groups (4,4-dimethyl-4,5-dihydro-[1,2,3] thiadiazole-1,1-dioxide, decomposition temperature: 162° C.)).

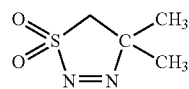
(1-7)

COMPARATIVE EXAMPLE 1

A nonaqueous secondary battery was produced in the same manner as in Example 1 except that the six-membered ring compound was changed to a ten-membered ring compound, that is, a cyclic nitrogen-containing compound represented by the general formula (1b), wherein X represents a hydrocarbon group having 6 carbon atoms, and $R_1$ to $R_4$ represent hydrogen atoms (3,4,5,6,7,8,9,10-octahydro-[1,2]diazecine, decomposition temperature: 206° C.).

COMPARATIVE EXAMPLE 2

A nonaqueous secondary battery was produced in the same manner as in Example 1 except that no amine derivative was used.

COMPARATIVE EXAMPLE 3

A nonaqueous secondary battery was produced in the same manner as in Example 1 except that no cyclic nitrogen-containing compound was used.

COMPARATIVE EXAMPLE 4

A nonaqueous secondary battery was produced in the same manner as in Example 1 except that no cyclic nitrogen-containing compound and no amine derivative was used.

COMPARATIVE EXAMPLE 5

A nonaqueous secondary battery was produced in the same manner as in Example 1 except that 2 g of azobis (isobutyronitrile) (AIBN) was uses instead of the cyclic nitrogen-containing compound and no amine derivative was used.

(Method for Testing Battery Performance)

The nonaqueous secondary batteries obtained in Examples 1 to 13 and Comparative Examples 1 to 5 were measured for the initial discharge capacity and the discharge capacity retention at 20° C. and 60° C. as a battery performance test, measured for the discharge capacity retention and the discharge capacity recovery rate after storage at 60° C. as a high-temperature storage stability test, and tested for the safety by a nail penetration test as follows.

(1) Measurement for Initial Discharge Capacity at 20° C.

The capacity measured after each nonaqueous secondary battery is charged up to 4.2 V at a rate of 0.1 CmA, and then discharged down to 3.0 V at a rate of 0.1 CmA is determined as the initial discharge capacity (mAh/g). The measurement is performed in an incubator set to a constant temperature of 20° C.

(2) Measurement for Discharge Capacity Retention at 20° C.

A cycle of charging each nonaqueous secondary battery up to 4.2 V at a rate of 1 CmA and discharging the battery down to 3.0 V at a rate of 1 CmA is repeated 99 times, and then a cycle of charging and discharging under the same condition as in the measurement for the initial discharge capacity is completed for the 100th time, whereupon the battery is measured for the capacity.

After completion of the measurement for the 100th time, a cycle of charging each nonaqueous secondary battery up to 4.2 V at a rate of 1 CmA and discharging the battery down to 3.0 V at a rate of 1 CmA is repeated 399 times, and then a cycle of charging and discharging under the same condition as in the measurement for the initial discharge capacity is completed for the 500th time in total, whereupon the battery is measured for the capacity.

The discharge capacity retention (%) at the 100th cycle and the discharge capacity retention (%) at the 500th cycle are defined as the percentage of the initial discharge capacity accounted for by the discharge capacity at the 100th cycle and the percentage of the initial discharge capacity accounted for by the discharge capacity at the 500th cycle, respectively. The measurement is performed in an incubator set to a constant temperature of 20° C.

(3) Initial Discharge Capacity and Discharge Capacity Retention at 60° C.

The measurement for the initial discharge capacity (mAh/g) and the discharge capacity retention (%) at 60° C. is performed in the same manner as in the measurement for the initial discharge capacity and the discharge capacity retention at 20° C. except that the temperature of the incubator is set to a constant temperature of 60° C.

(4) Measurement for Discharge Capacity Retention and Discharge Capacity Recovery Rate after Storage at 60° C.

In an incubator at a constant temperature of 20° C., a cycle of charging each nonaqueous secondary battery up to 4.2 V at a rate of 0.1 CmA and discharging the battery down to 3.0 V at a rate of 0.1 CmA is repeated twice. After the charging for the third cycle, the nonaqueous secondary battery is stored at 60° C. for 10 days. Thereafter, the nonaqueous secondary battery is discharged down to 3.0 V at a rate of 0.1 CmA at 20° C. to be determined for the discharge capacity for the third cycle. Further, for the fourth cycle, the nonaqueous secondary battery is charged up to 4.2 V at a rate of 0.1 CmA, and then discharged down to 3.0 V at a rate of 0.1 CmA.

The discharge capacity retention (%) after storage at 60° C. is defined as the percentage of the discharge capacity for the second cycle accounted for by the discharge capacity for the third cycle.

The discharge capacity recovery rate (%) after storage at 60° C. is defined as the percentage of the discharge capacity for the second cycle accounted for by the discharge capacity for the forth cycle.

(5) Nail Penetration Test

As the nail penetration test, a nail having a diameter of 3 mm is driven into each nonaqueous secondary battery having been charged up to 4.2 V at a rate of 0.1 CmA so that the nail penetrates the battery at a speed of 1 mm/s at a room temperature of 20° C. to observe the state of the battery.

Tables 1 to 3 show the test results.

TABLE 1

|  |  |  | \multicolumn{7}{c}{Examples} | | | | | | |
| --- | --- | --- | --- | --- | --- | --- | --- | --- | --- |
|  |  |  | 1 | 2 | 3 | 4 | 5 | 6 | 7 |
| Non-aqueous electrolyte solution | electrolyte salt | Type | LiPF6 | LiPF6 | LiPF6 | LiPF6 | LiPF6 | LiPF6 | LiPF6 |
|  | Non-aqueous solvent | Type | EC/DEC | EC/DEC | EC/DEC | EC/DEC | EC/DEC | EC/DEC | EC/Amine derivative |
|  |  | (Vol. ratio) | (1/2) | (1/2) | (1/2) | (1/2) | (1/2) | (1/2) | (1/2) |
|  |  | (wt %/vol %) | 79.5/77.66 | 98.5/98.41 | 39.5/36.86 | 77.0/75.31 | 79.5/77.66 | 79.5/77.66 | 80.0/77.51 |
|  | Cyclic N-containing compound | Type | 1-1 | 1-1 | 1-1 | 1-1 | 1-1 | 1-1 | 1-1 |
|  |  | (wt %/vol %) | 20/21.88 | 1/1.12 | 60/62.70 | 20/21.91 | 20/21.88 | 20/21.88 | 20/22.49 |
|  | Amine derivative | Type | A | A | A | A | B | C | A |
|  |  | (wt %/vol %) | 0.5/0.46 | 0.5/0.47 | 0.5/0.44 | 3.0/2.78 | 0.5/0.46 | 0.5/0.46 | — |
| Electric characteristics 20° C. | Initial | DC* (mAh/g) | 144.3 | 145.2 | 141.6 | 142.8 | 144.1 | 144.2 | 141.9 |
|  | $100^{th}$ cycle | DC* (mAh/g) | 141.4 | 143.7 | 134.5 | 138.5 | 141.2 | 141.3 | 134.8 |
|  |  | DCR** (%) | 98 | 99 | 95 | 97 | 98 | 98 | 95 |
|  | $500^{th}$ cycle | DC* (mAh/g) | 129.9 | 132.1 | 121.8 | 127.1 | 129.7 | 129.8 | 122.0 |
|  |  | DCR** (%) | 90 | 91 | 86 | 89 | 90 | 90 | 86 |
| Electric characteristics 60° C. | Initial | DC* (mAh/g) | 142.3 | 143.7 | 140 | 141.9 | 141.7 | 142 | 140.4 |
|  | $100^{th}$ cycle | DC* (mAh/g) | 129.5 | 132.2 | 123.2 | 126.3 | 127.5 | 129.2 | 125.0 |
|  |  | DCR** (%) | 91 | 92 | 88 | 89 | 90 | 91 | 89 |
|  | $500^{th}$ cycle | DC* (mAh/g) | 113.8 | 117.8 | 106.4 | 112.1 | 113.4 | 115.0 | 109.5 |
|  |  | DCR** (%) | 80 | 82 | 76 | 79 | 80 | 81 | 78 |
| High-temp. storage stability | Capacity retention after high-temp. storage (%) |  | 93 | 94 | 90 | 92 | 93 | 93 | 91 |
|  | Recovery rate after high-temp. storage (%) |  | 93 | 94 | 89 | 92 | 92 | 93 | 90 |
| Nail penetration test |  |  | NAE*** | NAE*** | NAE*** | NAE*** | NAE*** | NAE*** | NAE*** |

DC*: Discharge Capacity
DCR**: Discharge Capacity Retention
NAE***: No abnormal event

TABLE 2

|  |  |  | \multicolumn{6}{c}{Examples} | | | | | |
| --- | --- | --- | --- | --- | --- | --- | --- | --- |
|  |  |  | 8 | 9 | 10 | 11 | 12 | 13 |
| Non-aqueous electrolyte solution | electrolyte salt | Type | LiPF6 | LiPF6 | LiPF6 | LiPF6 | LiPF6 | LiPF6 |
|  | Non-aqueous solvent | Type | EC/DEC | EC/DEC | EC/DEC | EC/DEC | EC/DEC | EC/DEC |
|  |  | (Vol. ratio) | (1/2) | (1/2) | (1/2) | (1/2) | (1/2) | (1/2) |
|  |  | (wt %/vol %) | 79.5/77.66 | 79.5/77.66 | 79.5/77.66 | 79.5/77.66 | 79.5/77.66 | 79.5/77.66 |
|  | Cyclic N-containing compound | Type | 1-2 | 1-3 | 1-4 | 1-5 | 1-6 | 1-7 |
|  |  | (wt %/vol %) | 20/21.88 | 20/21.88 | 20/21.88 | 20/21.88 | 20/21.88 | 20/21.88 |
|  | Amine derivative | Type | A | A | A | A | A | A |
|  |  | (wt %/vol %) | 0.5/0.46 | 0.5/0.46 | 0.5/0.46 | 0.5/0.46 | 0.5/0.46 | 0.5/0.46 |
| Electric characteristics 20° C. | Initial | DC* (mAh/g) | 142 | 137.8 | 143.4 | 144.1 | 144.2 | 142.9 |
|  | $100^{th}$ cycle | DC* (mAh/g) | 140.6 | 130.9 | 137.7 | 138.5 | 141.3 | 140.0 |
|  |  | DCR** (%) | 99 | 95 | 96 | 96 | 98 | 98 |
|  | $500^{th}$ cycle | DC* (mAh/g) | 125.0 | 117.1 | 127.6 | 129.9 | 134.1 | 131.5 |
|  |  | DCR** (%) | 88 | 85 | 89 | 90 | 93 | 92 |

TABLE 2-continued

|   |   |   | Examples | | | | | |
|---|---|---|---|---|---|---|---|---|
|   |   |   | 8 | 9 | 10 | 11 | 12 | 13 |
| Electric characteristics 60° C. | Initial | DC* (mAh/g) | 140.3 | 139.2 | 141.6 | 142.6 | 143.8 | 142.8 |
|   | 100$^{th}$ cycle | DC* (mAh/g) | 129.1 | 122.5 | 128.9 | 129.8 | 135.2 | 134.2 |
|   |   | DCR** (%) | 92 | 88 | 91 | 91 | 94 | 94 |
|   | 500$^{th}$ cycle | DC* (mAh/g) | 110.8 | 103.0 | 113.3 | 119.8 | 126.5 | 125.7 |
|   |   | DCR** (%) | 79 | 74 | 80 | 84 | 88 | 88 |
| High-temp. storage stability | Capacity retention after high-temp. storage (%) |   | 93 | 89 | 91 | 92 | 93 | 93 |
|   | Recovery rate after high-temp. storage (%) |   | 92 | 89 | 90 | 91 | 92 | 92 |
| Nail penetration test |   |   | NAE*** | NAE*** | NAE*** | NAE*** | NAE*** | NAE*** |

TABLE 3

|   |   |   | Comparative Examples | | | | |
|---|---|---|---|---|---|---|---|
|   |   |   | 1 | 2 | 3 | 4 | 5 |
| Non-aqueous electrolyte solution | electrolyte salt | Type | LiPF6 | LiPF6 | LiPF6 | LiPF6 | LiPF6 |
|   | Non-aqueous solvent | Type | EC/DEC | EC/DEC | EC/DEC | EC/DEC | EC/DEC |
|   |   | (Vol. ratio) | (1/2) | (1/2) | (1/2) | (1/2) | (1/2) |
|   |   | (wt %/vol %) | 79.5/77.66 | 80/78.13 | 99.5/99.53 | 100/100 | 98*****/- |
|   | Cyclic N-containing compound | Type | 1-8 | 11 | — | — | AIBN |
|   |   | (wt %/vol %) | 20/21.88 | 20/21.87 | — | — | 2*****/- |
|   | Amine derivative | Type | A | — | A | — | — |
|   |   | (wt %/vol %) | 0.5/0.46 | — | 0.5/0.47 | — | — |
| Electric characteristics 20° C. | Initial | DC* (mAh/g) | 135.6 | 141.6 | 145.0 | 140.4 | 116.3 |
|   | 100$^{th}$ cycle | DC* (mAh/g) | 122.0 | 137.4 | 143.6 | 129.2 | 104.7 |
|   |   | DCR** (%) | 90 | 97 | 99 | 92 | 90 |
|   | 500$^{th}$ cycle | DC* (mAh/g) | 108.5 | 126.0 | 133.4 | 115.1 | 87.2 |
|   |   | DCR** (%) | 80 | 89 | 92 | 82 | 75 |
| Electric characteristics 60° C. | Initial | DC* (mAh/g) | 126.2 | 139.8 | 143.6 | 137.2 | — |
|   | 100$^{th}$ cycle | DC* (mAh/g) | 88.3 | 110.4 | 133.5 | 107.0 | — |
|   |   | DCR** (%) | 70 | 79 | 93 | 78 | — |
|   | 500$^{th}$ cycle | DC* (mAh/g) | 71.9 | 90.9 | 122.1 | 83.7 | — |
|   |   | DCR** (%) | 57 | 65 | 85 | 61 | — |
| High-temp. storage stability | Capacity retention after high-temp. storage |   | 73 | 81 | 93 | 79 | — |
|   | Recovery rate after high-temp. storage |   | 72 | 78 | 93 | 76 | — |
| Nail penetration test |   |   | NAE*** | NAE*** | SF**** | SF**** | SF**** |

SF****: Smoke and fire
*****Parts by weight; vol % is not shown as AIBN is a solid.

Tables 1 to 3 show that the general nonaqueous secondary battery using a general organic solvent as a nonaqueous solvent and containing no flame retardant (Comparative Example 4) experienced generation of smoke and generation of fire in the nail penetration test. The nonaqueous secondary battery of Comparative Example 3 also experienced generation of smoke and generation of fire in the nail penetration test as containing no cyclic nitrogen-containing compound. On the other hand, the nonaqueous secondary batteries each having a cyclic nitrogen-containing compound added to a nonaqueous solvent (Examples 1 to 13) did not experience abnormal events such as generation of smoke and generation of fire in the nail penetration test. Furthermore, with respect to the battery performance, the nonaqueous secondary batteries of Examples 1 to 13 are in no way inferior to the nonaqueous secondary battery of Comparative Example 3 containing no cyclic nitrogen-containing compound.

In addition, the nonaqueous secondary battery of Comparative Example 1 using a cyclic nitrogen-containing compound having a ten-membered ring compound did not experience abnormal events such as generation of smoke and generation of fire in the nail penetration test as in the case of Examples 1 to 13. However, the nonaqueous secondary battery of Comparative Example 1 is inferior in the battery performance to the nonaqueous secondary battery of Comparative Example 3 containing no cyclic nitrogen-containing compound. When heated to 60° C., in particular, the battery performance of Comparative Example 1 is significantly inferior to that of Examples 1 to 13.

Furthermore, when heated to 60° C., Comparative Example 2 containing a cyclic nitrogen-containing compound and no amine derivative is significantly inferior in the battery performance to Examples 1 to 13. Comparative Example 2 is inferior also in the high-temperature storage stability.

As described above, Tables 1 to 3 show that it is possible to obtain a nonaqueous secondary battery improved in the flame retardancy and superior in the electric characteristics to a conventional one by using a nonaqueous electrolyte solution containing a cyclic nitrogen-containing compound and an amine derivative each having a specific structure.

(Synthesis of Cyclic Nitrogen-Containing Compounds in Examples 1 to 9 and Comparative Example 1)

The cyclic nitrogen-containing compounds of Examples 1 to 9 and Comparative Example 1 were obtained as described below according to the following synthesis scheme:

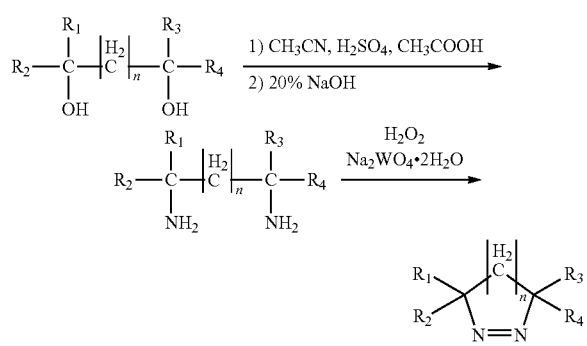

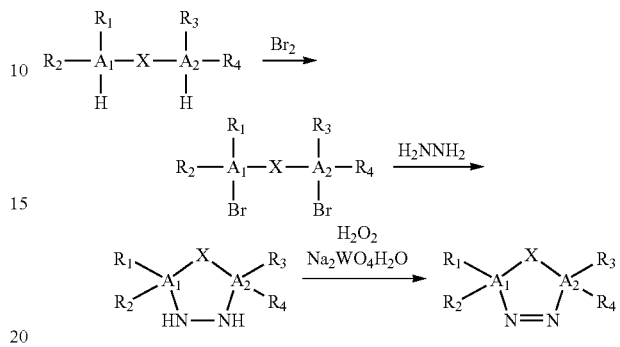

(Synthesis of Cyclic Nitrogen-Containing Compounds of Example 10)

The cyclic nitrogen-containing compound of Example 10 was obtained as described below according to the following synthesis scheme:

To a three-necked flask having a stirrer, a dropping funnel and a cooling tube, 18.1 g (0.44 mol) of acetonitrile, 200 ml of glacial acetic acid and 40 g of concentrated sulfuric acid were added and the outside of the flask was ice-cooled. Next, 58.4 g (0.40 mol) of a diol derivative (2,5-dimethylhexane-2,5-diol) was slowly added dropwise under stirring. After completion of the dropping, the resulting solution was stirred for 24 hours, dissolved in 500 ml of water and rendered alkaline with sodium carbonate. The resulting solution was extracted with ether. The solvent was distilled off to obtain an acetamide derivative. The acetamide derivative was added to 600 ml of an ethylene glycol solution of 20% sodium hydroxide and refluxed for 48 hours. After completion of the reaction, the reaction solution was distilled at a temperature of 180° C. or less, and the distillatory solution was extracted with ether. After drying, the solvent was distilled off to obtain 30.6 g of a diamine derivative (2,5-dimethylhexane-2,5-diamine) (yield 53.2%).

In a three-necked flask having a stirrer, a dropping funnel and a cooling tube, 28.8 g (0.20 mol) of the diamine derivative obtained was dissolved in 500 ml of a mixed solution of water and ethanol (mixing ratio: 1:1), and 0.66 g (0.002 mol) of sodium tungstate dihydrate was added thereto to be heated to approximately 60° C. Next, 90 ml of 35% hydrogen peroxide aqueous solution was gradually added dropwise. After completion of the dropping, the resulting solution was stirred at a temperature of 78° C. to 80° C. for approximately 2 hours, and then cooled to room temperature. After completion of the reaction, an organic layer obtained through extraction with chloroform was concentrated, and then subjected to vacuum distillation to obtain 12.1 g of a cyclic nitrogen-containing compound (yield 43.1%). The cyclic nitrogen-containing compound obtained was measured for NMR and IR to give the following values:

$^1$H-NMR (ppm, $CDCl_3$) δ; 1.56 (s, 4H), 1.29 (s, 12H)

IR; ν (KBr) $cm^{-1}$; 2966, 2893, 1576, 1303, 1242, 1131, 1004, 962

The values confirmed that the cyclic nitrogen-containing compound obtained was 3,3,6,6-tetramethyl-3,4,5,6-tetrahydropyridazine.

The cyclic nitrogen-containing compounds (Example 8: dichloro-4,5-dihydro-3H-pyrazole; Example 9: 4,5,6,7,8,9-hexahydro-3H-[1,2]diazonine; Comparative Example 1: 3,4,5,6,7,8,9,10-octahydro-[1,2]diazecine) were obtained in the same manner as in Example 1 except that the diol derivative was changed to 1,3-dichloropropan-1,3-diol in Example 8, to heptane-1,7-diol in Example 9, and to octane-1,8-diol in Comparative Example 1, respectively.

The cyclic nitrogen-containing compound of Example 10 was obtained as described below according to the following synthesis scheme:

In a three-necked flask having a stirrer and a dropping funnel, 61.3 g (0.6 mol) of a starting material was dissolved in 150 ml of chloroform, and the outside of the flask was ice-cooled. Next, 105 g (0.66 mol) of bromine was slowly added dropwise under stirring. After completion of the dropping, the resulting solution was stirred for approximately 1 hour, washed with water, washed with an $Na_2CO_3$ aqueous solution, and then washed with water. The solvent was distilled off to obtain 139 g of a dibromo derivative (yield 90.0%).

In a three-necked flask having a stirrer, a dropping funnel and a cooling tube having been placed under a nitrogen atmosphere, 14.4 g (0.45 mol) of hydrazine anhydrous and absolute ethanol were added and stirred. Next, 129 g (0.5 mol) of the dibromo derivative was slowly added dropwise. After completion of the dropping, the resulting solution was refluxed for approximately 1 hour, and then distilled to obtain 48.4 g of a diaziridine derivative (yield 82.7%).

In a three-necked flask having a stirrer, a dropping funnel and a cooling tube, 39 g (0.3 mol) of the diaziridine derivative obtained was dissolved in 500 ml of a mixed solution of water and ethanol (mixing ratio: 1:1), and 0.99 g (0.003 mol) of sodium tungstate dihydrate was added thereto to be heated to approximately 60° C. Next, 90 ml of 35% hydrogen peroxide aqueous solution was gradually added dropwise. After completion of the dropping, the resulting solution was stirred at a temperature of 78° C. to 80° C. for approximately 2 hours, and then cooled to room temperature. After completion of the reaction, an organic layer obtained through extraction with chloroform was concentrated, and then subjected to vacuum distillation to obtain 16.4 g of a cyclic nitrogen-containing compound (yield 42.7%).

The cyclic nitrogen-containing compound obtained was measured for NMR and IR to give the following values:

$^1$H-NMR (ppm, $CDCl_3$) δ; 1.37 (s, 12H)

IR; ν (KBr) $cm^{-1}$; 3081, 1952, 1390, 1242, 943, 522

The values confirmed that the cyclic nitrogen-containing compound obtained was 2,2,5,5-tetramethyl-1,3,4-oxadiazoline.

(Synthesis of Cyclic Nitrogen-Containing Compounds of Examples 11 to 13)

The cyclic nitrogen-containing compounds were obtained in the same manner as in Example 10 except that the starting material was changed to 2,4-dimethyl-3-pentanone in Example 11, to methanedisulfonyl dichloride in Example 12, and to 2-chloro-2-methylpropane sulfonyl chloride in Example 13, respectively.

According to the present invention, the nonaqueous electrolyte solution is allowed to contain a cyclic compound having a nitrogen-nitrogen unsaturated bond in its molecule, and thereby the nonaqueous secondary battery is enabled to produce sufficient flame retardancy. As a result, risk of thermal runaway can be reduced even in an abnormal situation such as where the internal temperature of the nonaqueous secondary battery rises due to short-circuit, overcharge or any other reasons. In addition, the combined use of an amine derivative achieves improvement of the nonaqueous secondary battery in electric characteristics such as cycle characteristics. Accordingly, it is possible to provide a nonaqueous secondary battery improved in safety and reliability.

When the cyclic nitrogen-containing compound is a compound represented by the following general formula (1a):

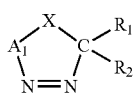

(1a)

wherein X and $A_1$ are as defined in the general formula (1), and $R_1$ and $R_2$ may be the same or different and each represent hydrogen atom, halogen atom, lower alkyl group, lower alkoxy group, ester group, optionally substituted cycloalkyl group or optionally substituted aryl group, it is possible to provide a nonaqueous secondary battery further improved in the flame retardancy without degrading the battery performance.

When the cyclic nitrogen-containing compound is a compound represented by the following general formula (1b):

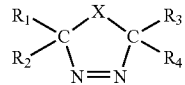

(1b)

wherein X, $R_1$ and $R_2$ are as defined in the general formula (1a), and $R_3$ and $R_4$ may be the same or different and each represent hydrogen atom, halogen atom, lower alkyl group, lower alkoxy group, ester group, optionally substituted cycloalkyl group or optionally substituted aryl group, it is possible to provide a nonaqueous secondary battery further improved in the flame retardancy without degrading the battery performance.

When the cyclic nitrogen-containing compound is a compound represented by the following general formula (1c):

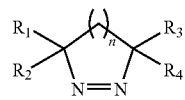

(1c)

wherein "n" represents an integer from 1 to 5, and $R_1$ to $R_4$ are as defined in the general formula (1b), it is possible to provide a nonaqueous secondary battery further improved in the flame retardancy without degrading the battery performance.

When the cyclic nitrogen-containing compound is contained in the nonaqueous electrolyte solution at a proportion of 1 to 70% by volume, it is possible to provide a nonaqueous secondary battery further improved in the flame retardancy without degrading the battery performance.

When the cyclic nitrogen-containing compound is a compound that produces nitrogen gas when heated at a temperature higher than its decomposition temperature, it is possible to provide a nonaqueous secondary battery further improved in the flame retardancy without degrading the battery performance.

When the cyclic nitrogen-containing compound is a compound having a decomposition temperature of 120 to 250° C., it is possible to provide a nonaqueous secondary battery further improved in the flame retardancy without degrading the battery performance.

When the amine derivative has $R_5$ to $R_7$ selected from optionally substituted lower alkyl group, lower cycloalkyl group and aryl group, it is possible to provide a nonaqueous secondary battery further improved in the flame retardancy without degrading the battery performance.

When the amine derivative is contained in the nonaqueous electrolyte solution at a proportion of 0.09 to 80% by volume, it is possible to provide a nonaqueous secondary battery further improved in the flame retardancy without degrading the battery performance.

What is claimed is:

1. A nonaqueous secondary battery comprising: a positive electrode; a negative electrode; and a nonaqueous electrolyte solution, wherein the nonaqueous electrolyte solution contains: a cyclic nitrogen-containing compound represented by the general formula (1):

(1)

wherein X represents an optionally branched divalent group derived from a chain saturated hydrocarbon and having 1 to 5 carbon atoms, $=C=CH_2$, $=C=O$, $=C=S=O$, $=O$ or $=S$, and $A_1$ and $A_2$ may be the same or different and each represent an optionally substituted methylene group, $=C=O$ or $=SO_2$; and an amine derivative represented by the general formula (2):

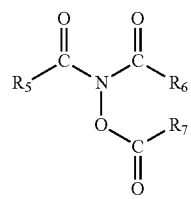

(2)

wherein $R_5$ to $R_7$ may be the same or different and each represent a hydrogen atom, or an optionally substituted lower alkyl group, lower alkenyl group, lower alkoxy group, lower alkylcarbonyloxy group, lower alkylcarbonyl group, lower cycloalkyl group or aryl group.

2. The nonaqueous secondary battery according to claim 1, wherein the cyclic nitrogen-containing compound is a compound represented by the following general formula (1a):

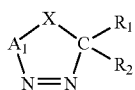

wherein X and $A_1$ are as defined in the general formula (1), and $R_1$ and $R_2$ may be the same or different and each represent hydrogen atom, halogen atom, lower alkyl group, lower alkoxy group, ester group, optionally substituted cycloalkyl group or optionally substituted aryl group.

3. The nonaqueous secondary battery according to claim 1, wherein the cyclic nitrogen-containing compound is a compound represented by the following general formula (1b):

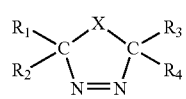

wherein X, $R_1$ and $R_2$ are as defined in the general formula (1a), and $R_3$ and $R_4$ may be the same or different and each represent hydrogen atom, halogen atom, lower alkyl group, lower alkoxy group, ester group, optionally substituted cycloalkyl group or optionally substituted aryl group.

4. The nonaqueous secondary battery according to claim 1, wherein the cyclic nitrogen-containing compound is a compound represented by the following general formula (1c):

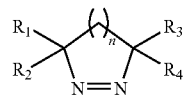

wherein "n" represents an integer from 1 to 5, and $R_1$ to $R_4$ are as defined in the general formula (1b).

5. The nonaqueous secondary battery according to claim 1, wherein the cyclic nitrogen-containing compound is contained in the nonaqueous electrolyte solution at a proportion of 1 to 70% by volume.

6. The nonaqueous secondary battery according to claim 1, wherein the cyclic nitrogen-containing compound is a compound that produces nitrogen gas when heated at a temperature higher than its decomposition temperature.

7. The nonaqueous secondary battery according to claim 1, wherein the cyclic nitrogen-containing compound is a compound having a decomposition temperature of 120 to 250° C.

8. The nonaqueous secondary battery according to claim 1, wherein the amine derivative has $R_5$ to $R_7$ selected from optionally substituted lower alkyl group, lower cycloalkyl group and aryl group.

9. The nonaqueous secondary battery according to claim 1, wherein the amine derivative is contained in the nonaqueous electrolyte solution at a proportion of 0.09 to 80% by volume.

10. A flame retardant for a nonaqueous secondary battery, comprising: a cyclic nitrogen-containing compound represented by the general formula (1):

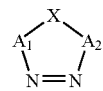

wherein X represents an optionally branched divalent group derived from a chain saturated hydrocarbon and having 1 to 5 carbon atoms, $=C=CH_2$, $=C=O$, $=C=S=O$, $=O$ or $=S$, and $A_1$ and $A_2$ may be the same or different and each represent an optionally substituted methylene group, $=C=O$ or $=SO_2$; and an amine derivative represented by the general formula (2):

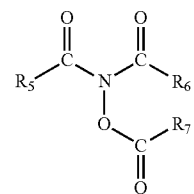

wherein $R_5$ to $R_7$ may be the same or different and each represent a hydrogen atom, or an optionally substituted lower alkyl group, lower alkenyl group, lower alkoxy group, lower alkylcarbonyloxy group, lower alkylcarbonyl group, lower cycloalkyl group or aryl group.

* * * * *